United States Patent [19]

Bradford et al.

[11] 4,426,665

[45] Jan. 17, 1984

[54] AUTOMATIC TRACK FOLLOWING FEATURE FOR HELICAL VIDEO RECORDER

[75] Inventors: Robert S. Bradford, Woodland Hills; Marshall R. Brookhart, Thousand Oaks; Bennett G. Dy, Mission Viejo, all of Calif.

[73] Assignee: Minnesota Mining and Manufacturing Company, St. Paul, Minn.

[21] Appl. No.: 445,701

[22] Filed: Dec. 1, 1982

Related U.S. Application Data

[63] Continuation of Ser. No. 138,436, Apr. 8, 1980, abandoned.

[51] Int. Cl.³ ............................................. H04N 5/783
[52] U.S. Cl. .................................. 360/10.2; 360/10.3
[58] Field of Search .................. 360/10.1, 10.2, 10.3, 360/11.1, 75, 77, 78; 358/312

[56] References Cited

U.S. PATENT DOCUMENTS

| 4,080,636 | 3/1978 | Ravizza | 360/77 |
|---|---|---|---|
| 4,141,047 | 2/1979 | Kambara et al. | 360/77 |
| 4,141,048 | 2/1979 | Kubota et al. | 360/77 |
| 4,143,405 | 3/1979 | Kubota | 360/77 |
| 4,148,083 | 4/1979 | Watanabe | 360/77 |
| 4,151,569 | 4/1979 | Hathaway | 360/77 |
| 4,151,570 | 4/1979 | Ravizza et al. | 360/77 |
| 4,163,993 | 8/1979 | Ravizza | 360/77 |
| 4,167,763 | 9/1979 | Kubota | 360/77 |
| 4,197,565 | 4/1980 | Watanabe | 360/77 |
| 4,255,768 | 3/1981 | Kubota | 360/10.2 |

FOREIGN PATENT DOCUMENTS

| 2345035 | 10/1977 | France . |
| 49-84617 | 8/1974 | Japan . |
| 2016787 | 9/1979 | United Kingdom . |

Primary Examiner—Bernard Konick
Assistant Examiner—Donald McElheny, Jr.
Attorney, Agent, or Firm—Donald M. Sell; James A. Smith; William B. Barte

[57] ABSTRACT

An automatic track following feature for use with a helical video recorder is disclosed which enables reproduction of video fields at normal speeds, fast and slow forward and reverse speeds, and at stop motion, wherein a mechanism for moving a playback head transverse to the helical tracks on a magnetic tape is provided in order to enable the head to remain centered on the track regardless of tape speeds and directions of movement. A head position control signal is generated for driving the head positioning mechanism based on a comparison of a signal based on the instantaneous tape speed with a reference speed indicating signal.

10 Claims, 10 Drawing Figures

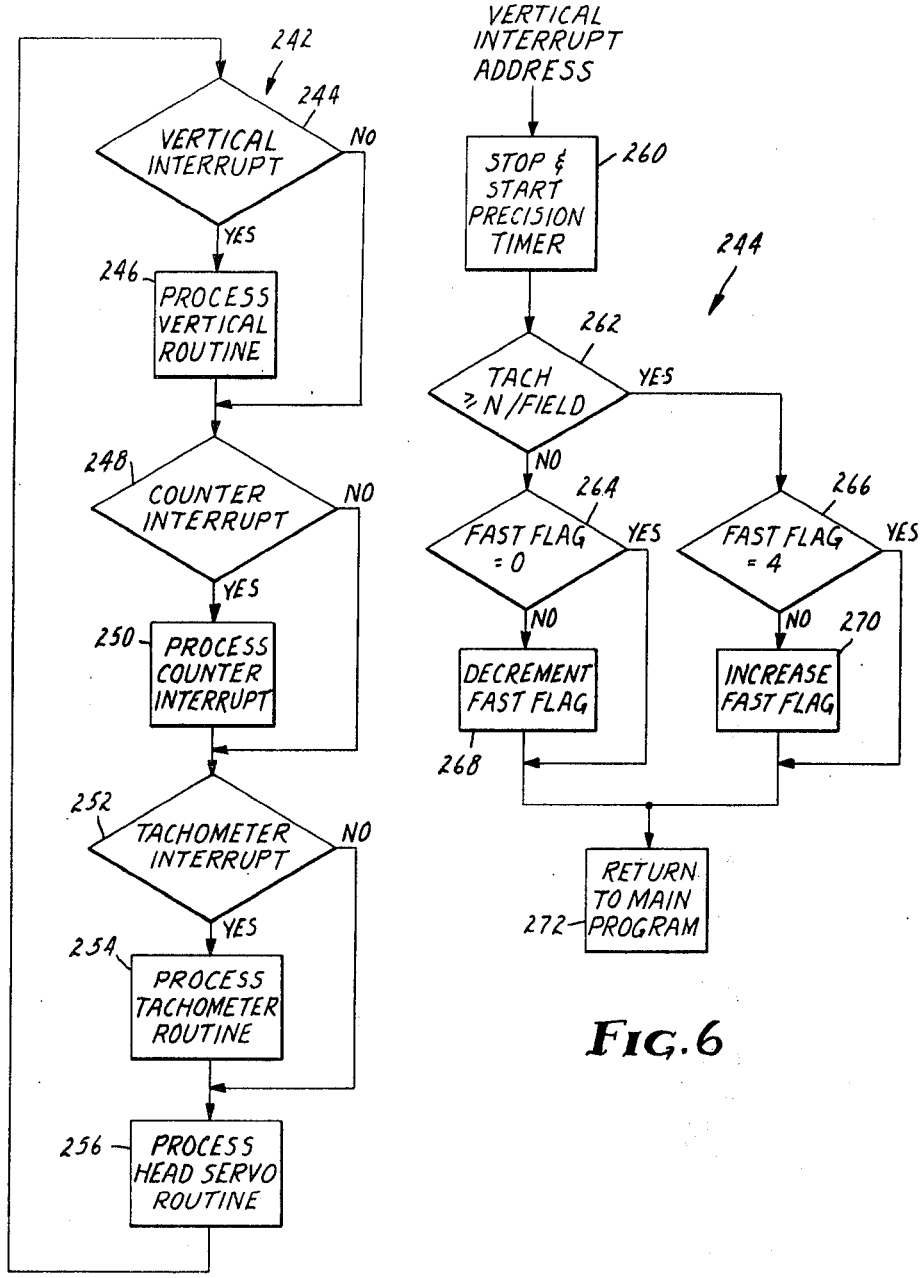

AUTOMATIC TRACK FOLLOWING FEATURE FOR HELICAL VIDEO RECORDER

This is a continuation of application Ser. No. 138,436, filed Apr. 8, 1980, now abandoned.

BACKGROUND OF THE INVENTION

1. Field of the Invention

This invention relates to magnetic recording and reproducing apparatus, particularly to video recorders and reproducers of the helical scanning type in which a magnetic record/playback head is operatively supported within a rotating drum for scanning a magnetic tape along a plurality of adjacent discrete tracks oriented at an angle relative to the lengthwise direction of the tape, and in which special track following features are provided to enable reproduction of pictures at normal speeds, fast and slow forward and reverse speeds, and at stop motion.

2. Description of the Prior Art

Helical scan video tape recorders embodying automatic track following features to compensate for non-uniform tape motion, tape stretching, and the like are becoming well known. Such recorders are, for example, disclosed in U.S. Pat. Nos. 4,143,405 (Kubota/Sony) and in 4,151,570 (Ravizza/Ampex).

In addition to such patents wherein track following is disclosed, it is also becoming known to provide helical scan video recorders with systems enabling the playback head to follow a selected helical track, regardless of the tape speed, be it normal playback forward, fast fowward, slow motion, stop motion and reverse. For example, patents disclosing recorders enabling such special effects are disclosed in U.S. Pat. Nos. 4,163,993 (Ravizza) and 4,233,637 (Kubota/Sony).

In a conventional helical scan video tape recorder, the rotary transducer or head assembly is provided with one or more magnetic transducers adapted to scan successive parallel tracks on a magnetic record tape so as to record and/or reproduce video signals along such tracks. In general, one or more of the transducers is caused to rotate, such as within a drum assembly so as to scan diagonally across the tape, while the tape itself is transported longitudinally. A typical helical scan VTR thus preferably includes at least one record or playback transducer within a drum assembly about at least a portion of which is wrapped the magnetic record tape. Typically, during recording, a servo system will be provided to ensure uniform motion of the tape and to control the rotation of the transducer with respect to the tape movement, while control pulse signals are recorded on a portion of the tape. During normal reproduction, a similar servo control system will be used to synchronize the movement of the tape and control the rotation of the head assembly in accordance with the recorded control pulse signals.

In recently disclosed VTR's capable of various kinds of reproducing motions, such as stop or still motion, slow motion, or quick and fast motion, the tape speed obviously differs from the tape speed utilized during recording. Consequently, during playback, the scanning path of each of the playback heads within the drum assembly is different from the path followed during recording. That is, the scanning path is inclined or differently angularly disposed with respect to the recorded track. As the result of such angular differences, in the various reproducing modes other than normal speed, guard band noise, cross talk, picture jumping, and the like will result from the tracking errors due to inclination of the scanning paths of the head relative to the recorded track.

Accordingly, for example, such as disclosed in U.S. Pat. No. 4,080,636 (Ravizza), such tracking errors are adapted to be corrected by mounting the playback head on an adjustable support assembly such as a piezoelectric reed which is adapted to deflect or flex in a direction generally transverse to the diagonal track along the tape. By means of a suitable error correction signal applied to the piezoelectric element, the head is appropriately deflected transverse to the tape track to cause the scanning path to coincide with the parallel record tracks.

Helical scan VTR's adapted to create special altered time base reference effects have not been particularly successful to date because of the spurious noise generated during playback due to the transducing head crossing from one track to another. For example, slow motion effects and video recording necessarily require that the data on one track, typically a full video field per track, be repeated one or more times during the playback so that the visual motion is slowed down. Similarly, for fast forward motion, one or more tracks must be skipped. The resultant path that the transducing head follows along the tape during such reproduction processes will therefore be substantially different than the recorded track that was made during the recording process. Thus, for example, an apparatus is disclosed in Belgian Pat. No. 852,626 (Hathaway et al), which permits the tracks to be accurately followed even though the transport speed varies within wide limits. While the apparatus there described represents a significant improvement over other helical scan VTR's in that it proposes to afford the capability of reproducing special motion effects, it similarly creates transient conditions resulting in noise bars in the video image under certain operating conditions.

In order to achieve such special motion effects by appropriately deflecting the playback head transverse to the diagonal tracks, it has been previously disclosed to generate a ramp type of signal which is coupled to a head deflection assembly in order to gradually increase the deflection of the head transversely in an amount proportional to the difference between the recorded tape path and that followed by the head. Thus, for example, in U.S. Pat. No. 4,233,637, an apparatus is depicted in which pulse generators are positioned adjacent a head drum assembly to provide pulses indicative of the head position, which pulses are then coupled to a ramp generator, together with appropriate additional pulses from stepdown counters and the like in order to provide the requisite ramp signal. In contrast, in Belgium Pat. No. 852,626 referenced above, such ramp signals are provided as the result of an integrator circuit, the input to which is driven in accordance with pulse generators responsive to a trigger pulse indicative of the end of each video scan and forward and reverse tape direction detectors.

SUMMARY OF THE INVENTION

In common with the prior art patents referenced above, the present invention is directed to a rotary scan video tape player of the type having a playback head operatively mounted within a rotatable drum for scanning a magnetic tape along a plurality of adjacent discrete tracks oriented at an angle relative to the lengthwise direction of the tape. In this player, the head is mounted within the drum on a head positioning transducer for effecting movement of the head within a given range in opposite directions relative to a nominal position along a path generally transverse to the direction of the tracks in response to a head position control signal.

The invention includes a network for forming the head position control signal which varies in amplitude and polarity for modifying the transverse position of the head according to the need to adjust the angle of the scanning path, the available range of the head positioning transducer and frame rate conversion requirements.

The instantaneous amplitude of the head position control signal is dictated by three components which are related according to the expression $$Y = Y_0 + Y_1 + Y_2,$$

where $Y_0$ represents an instantaneous amplitude component related to the difference between the tape speed employed during recording and the instantaneous tape speed, $Y_1$ represents an instantaneous amplitude component related to the need to reset the head positioning transducer at the end of appropriate field scan intervals to maintain it within its available range and to enable frame conversion, and $Y_2$ represents an instantaneous amplitude component for centering the head over the recorded tracks.

The magnitude of $Y_1$ is selected to cause the head to be reset upon the completion of each scan an integral multiple of the center to center track spacing distance D, depending upon frame conversion requirements and upon the position of the head relative to its normal position. Such resetting of the head to cause the head to repeat the same track or to jump or skip over adjacent tracks is required because, for example, the tape may be moving at one-half speed so each recorded frame will have to be repeated or played twice. Different speeds and directions of tape movement results in different field repeat or skip (in the case of speeds greater than normal) sequences.

Repeating or skipping a scanned field requires resetting the head to the correct position at the start of the next scan. Playing the next track in sequence requires that the waveform of the head positioning control signal continue without interruption through the next rotation of the scanning drum. Such a waveform can only be continued for a few rotations of the scanning drum before the head positioning transducer will exceed its allowed range. Thus frame conversion (repeat or skip) sequences must further be limited to the available dynamic range of the head positioning transducer.

In the present player, the network for forming the head position control signal thus includes means for generating each of the $Y_0$, $Y_1$, and $Y_2$ instantaneous amplitude components as discrete signal pulses, digital counter means coupled to said generating means for combining said discrete pulses and for providing a digital count representative of said combined count, said count being the digital representation of the instantaneous amplitude of said head position control signal, and means for converting said digital represenation into an analog signal, the magnitude of which is proportional to said count and for providing said head position control signal in which the instantaneous amplitude thereof is proportional to said analog signal.

The means for generating the $Y_0$ component includes means for providing a reference signal containing a predetermined number N of clock pulses for each head scan during which one video field recorded on the tape is traversed. Where each field has a duration $T_v$, the period of the clock pulses then equals $T_v(1/N)$. A reasonably large number of such clock pulses are provided for each video field, such as 32, in order that numerous head position adjustments may be made at relatively small increments along each helical track corresponding to each video field.

Means are further included for providing an instantaneous tape motion signal having tach pulses (M) indicative of the speed and direction of tape movement, respectively, the spacing between successive tach pulses corresponding to the time required for 1/N of the length of tape containing one video field to traverse a given location. The number of tach pulses M occurring during the time interval $T_v$ is equal to the number of N clock pulses occurring during the same interval when the playback speed is equal to the record speed.

Means are further provided for supplying the reference signal to the digital counter means for incrementing the number of counts therein by one count in a first direction upon each occurrence of a reference signal pulse, and for supplying said instantaneous tape motion signal to said digital counter means for incrementing the number of counts therein by one count in the opposite direction upon each occurrence of a tach pulse if such pulses are indicative of forward tape motion and for incrementing the number of counts therein by one count in the first direction upon each occurrence of a tach pulse if such pulses are indicative of reverse tape motion. The magnitude of the resultant component $Y_0$ thus varies between 0 and d, where d is equal to $$\frac{D(M - N)}{N},$$

and where D is the distance on the tape betwen adjacent tracks corresponding to successive fields such that at any time during each field scan the number remaining in the counter means is proportional to the distance required to move the head transverse to the direction of said tracks to compensate for differences between the instantaneous playback and record speed and direction of tape motion. Accordingly, in an ideal situation, the application of the head position control signal to the head position transducer causes transverse movement of the head in an amount commensurate with the relative shift of a given track as the result of tape movement to enable the head to align its path parallel with the track regardless of tape speeds or direction.

Means are also provided which respond to a vertical sync pulse for monitoring the magnitude of the head position control signal and the direction of tape motion for adding a reset signal component $Y_1$ into the head position control signal. The magnitude of the reset component $Y_1$ results in transverse movement of the head in multiples of the distance D, thereby allowing successive video fields recorded on the tape to be jumped, skipped or repeated, an explained in the rules set forth below.

The magnitude $Y_1$ of the reset signal component is controlled to reset the head positioning transducer at the start of each scan to whichever track relative to the track just scanned in appropriate to provide requisite frame conversion and to maintain the control signal within the available range of the head positioning transducer. The magnitude $Y_1$ thus consists of a positive or negative jump signal having an amplitude such as to cause the head to move transversely a distance which is an integral multiple of D, and is generated as needed at the end of each video field period $T_\nu$ according to the following rules:

Rule 1: For forward tape speeds between zero (i.e., stop motion) and normal (1x) at which $0 < M \leq N$ (a) If at the end of the video field period $T_\nu$, the magnitude of the head positioning control signal is such that the head is below its nominal center-line position, generate a jump signal causing the head to move a distance $+D$.

(b) If the magnitude of the control signal is such that the position of the head is above its nominal center position, inhibit the production of any reset signal.

Rule 2: For fast forward speeds, i.e., $>1x$ at which selected frames must be skipped, and at which $M > N$:

(a) If at the end of the video field priot $T_\nu$, the magnitude of the control signal is such that the position of the head is above its nominal center position, generate a skip signal causing the head to move a distance $-D$.

(b) If the magnitude of the control signal is such that the position of the head is at or below its nominal position, inhibit the production of any reset signal.

Rule 3: For Reverse speed, i.e., up to $-1x$, at which $M < 0$:

(a) If at the end of the video field period $T_\nu$, the magnitude of the control signal is such that the position of the head is below its nominal center position, generate a jump signal causing the head to move a distance $+D$. If the head position is still below its nominal position, generate a secod jump signal causing the head to move a second distance $+D$, i.e., double reset.

(b) If the magnitude of the control signal is such that the head is above its nominal center position, inhibit the production of any reset signal.

In a preferred embodiment, in order to center the head over the track and to accommodate capstan slip, the player of the present invention further includes track centering means responsive to the intensity of an RF video playback signal provided by the playback head for generating in a closed feedback loop, a head centering signal component having an amplitude $Y_2$ which modifies the head position control signal and thereby causes appropriate additional transverse movement of the head to thereby maintain the playback signal intensity at or near a maximum value. Desirably, such a means for generating a head centering signal component includes a detector means responsive to such a playback signal for providing a playback level sense signal which is indicative of the amplitude of the playback signal independent of the picture level therein. Thus, for example, such detector means may be provided with additional timing control signals such that the RF amplitude is determined during synchronization pulse intervals. The closed loop feedback signal means desirably further includes means for storing a digital representation of the level sense signal, together with means for comparing such as stored digital representation of the level sense signal with a subsequently received digital representation of the level sense signal for providing a digital error signal indicative of the relative amplitudes therebetween. Finally, such a signal generating means includes control means for supplementing the head position control signal to thereby control the transverse head movement so as to minimize the error signal.

BRIEF DESCRIPTION OF THE DRAWING

FIG. 5 is a simplified flow chart of the complete steps involved in processing signals pursuant to the present invention;

FIGS. 6-9 are detailed flow charts setting forth particular signal processing operations outlined in FIG. 5.

DESCRIPTION OF THE PREFERRED EMBODIMENTS

For the purpose of simplification and to facilitate understanding of the present invention, the latter is hereinafter described in detail with respect to an apparatus for recording and reproducing video signals such as in a video tape recorder (VTR). However the problems to which the invention is addressed and the solution of those problems as disclosed herein are not limited to video signal recording and/or reproducing apparatus. Accordingly, it is understood that the invention is similarly applicable to other types of analog and digital recording and reproducing devices.

Figure 1:
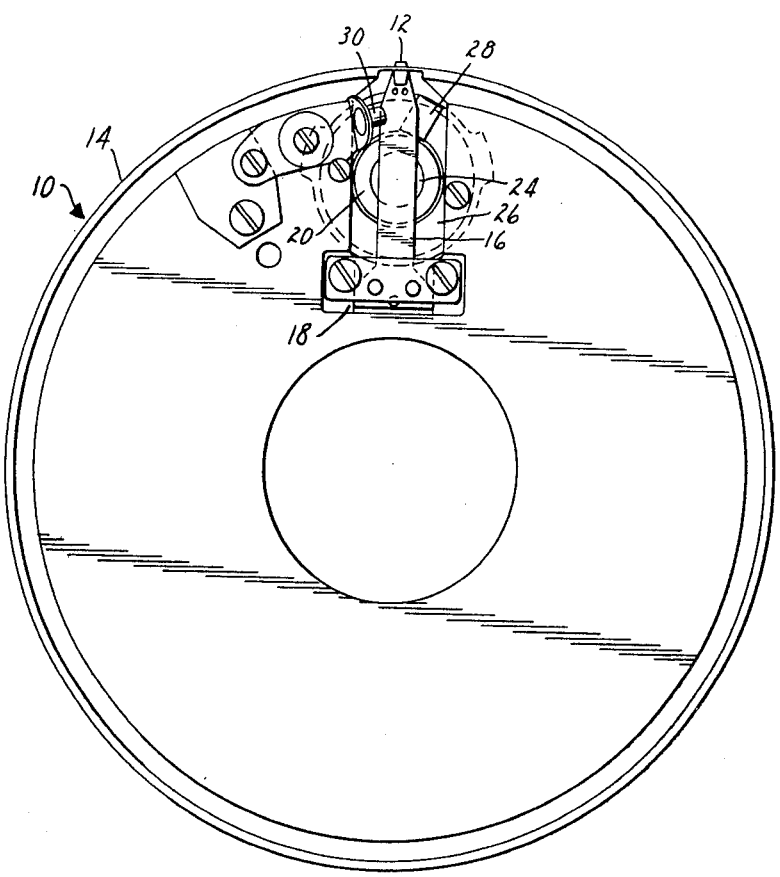
FIG. 1 is a top view of the rotating drum/playback head assembly utilized in the present invention.

Referring first to FIG. 1, it will be seen that a typical rotary head scanning device (scanner) 10, for example, such as used in a helical scan video tape recorder includes a magnetic record/playback head 12 which is mounted within a rotatable drum assembly 14 about the periphery of which a magnetic recording tape is wrapped in a helical path in either an alpha or an omega configuration. In such a recorder a magnetic tape will be guided by appropriate posts or rollers (not shown) to cause the tape to helically extend about a significant portion of the periphery of the drum 14 such that as the scanner rotates, the tape is moved diagonally across the periphery of the drum. The head 12 scans successive parallel skewed tracks across the tape and generates an electrical signal representative of the information previously recorded on the track. This electrical signal is then fed to signal processing circuitry for processing in a manner as set forth hereinafter.

It is apparent that the extent to which the head 12 can faithfully reproduce the information originally recorded on the successive helical tracks depends upon accurate registration of the head 12 with each of the successive tracks. Tracking problems arise, for example, when the video tapes or the tracks thereon become distorted, such as by temperature or humidity induced dimensional changes, or by movement of the tapes during playback at speeds other than that utilized during the recording process.

Because of such tracking problems, it is desirable to provide a signal indicative of the instantaneous position of the head 12 with respect to successive tracks on the record medium, and to further provide means responsive to such a signal for deflecting the head 12 transversely with respect to the tracks so as to enable centering of the head thereon. More particularly, when perfect tracking between the head 12 and each successive track is not occurring, a head centering component of the head position control signal is generated and applied to a head positioning assembly on which the head 12 is mounted. This signal causes the assembly to be deflected, thereby moving the head toward the track center to thereby reduce tracking errors. The deflection of the head thus not only enables the head to accurately follow tracks which may be distorted due to physical shrinkage or stretching, or the like, of the record medium, but also to follow tracks regardless of differences between the playback tape speed and the tape speed utilized during the previous recording operation.

Figure 2:
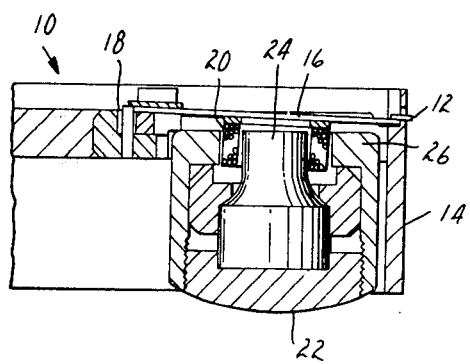
FIG. 2 is a cross-sectional side view of a portion of the drum assembly of FIG. 1, showing the details of the head mounting structure.

As shown in FIGS. 1 and 2, the head mounting means includes a flexible beam 16 which is cantilevered outward from a supporting pedestal 18, which is a portion of the drum 14. Also mounted on the cantilevered beam 16 is a drive coil 20, similar in construction to that utilized in a conventional electromagnetic type speaker and which is secured to the beam 16 by clamps and/or a suitable adhesive. Electrical leads (not shown) coupled to coil 20 are then connected to the stationary portion of the apparatus by means of a suitable slip-ring assembly.

As particularly shown in FIG. 2, the drive coil 20 is adapted to interact with a permanent magnetic structure 22 which includes a center pole member 24 and radial flux concentrating pole members 26. Accordingly, head position control signal in the form of a DC current impressed upon the drive coil 20 will cause the generation of a magnetic field which either opposes or aids the field produced by the permanent magnetic structure 22 and thereby creates a driving force on the beam 16 to move the head 12 from a center or nominal position along the axis of the drum assembly 14 and hence generally transverse to the tracks of the record media over a given range.

It is further desirable to provide an instantaneous signal indicative of the exact extent to which the head 12 is deflected within the drum 14 in order to enable closed-loop electrical damping of such movement. Accordingly, as is particularly evident in FIG. 1, an electro-optic means is included for sensing the extent of such transverse movement. Such a means includes a LED 28 mounted proximate to the head 12 and a phototransistor 30. These two members respectively are mounted such that the amount of light produced by the LED 28 is increasingly obscured by the beam 16 so as to modify the light received by the photo transistor 30 in direct proportion to the extent of transverse deflection of the beam 16. Not shown in FIG. 1, is a small printed circuit amplifier for providing an initial stage of amplification to the signal produced by the photo transistor 30 enabling coupling of the signal generated to the stationary portions of the recorder by means of a suitable slip-ring assembly (not shown). It may also be noted that electrical leads for signals produced by the head 12 may similarly be coupled to the non-rotating portions of the apparatus, such as by a suitable rotary transformer (not shown).

Figure 3:
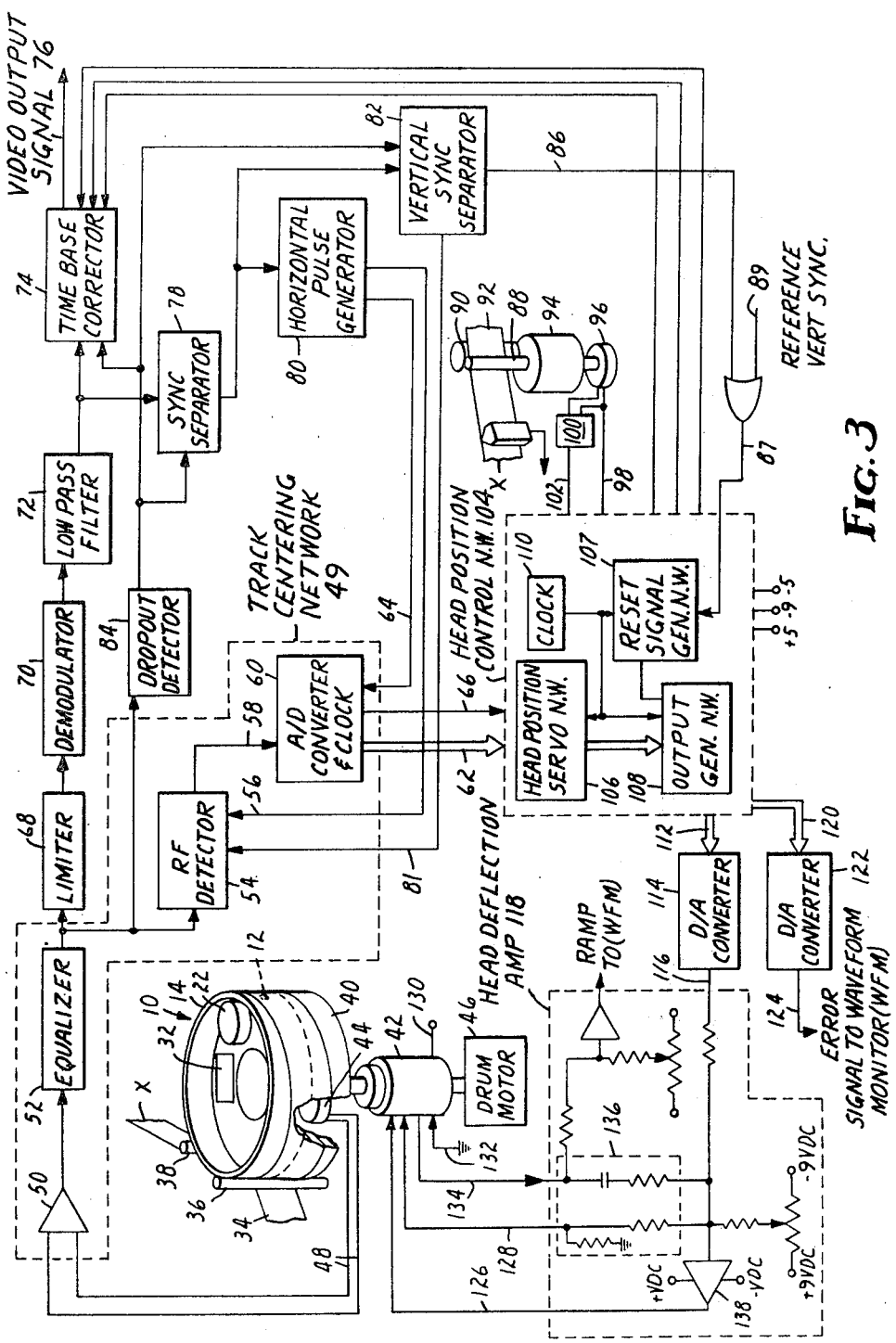
FIG. 3 is a combined pictorial and block diagram of one embodiment of the system of the present invention.

The manner by which the signals provided by the respective members within the rotating drum assembly 14 are processed to control the relative head position is further set forth in the combined pictorial and block diagram of FIG. 3. As may there be seen, the rotary head scanning device 10 includes the record/playback head 12 mounted on the rotating drum assembly 14, together with the permanent magnet structure 22, and the printed circuit amplifier 32. It may also there be seen that a magnetic tape 34 provided from a supply reel is helically guided around the drum assembly 14 by means of tracking guides 36 and 38. To further define the transport path for the tape, a second stationary drum 40 is positioned coaxial with the rotating drum assembly 14 and includes a helically inclined ramp which further assists in guiding the tape about the helical path. Also shown in conjunction with the rotary scanning device 10 is a slip-ring assembly 42 for coupling the signals from the head positioning mechanism and amplifier 32, a rotary transformer 44 for coupling the RF signals from the head 12, and the servo driven drum motor 46 for providing the requisite rotary motion to the assembly.

As further shown in FIG. 3, signals from the head 12 are coupled via the rotary transformer 44 on leads 48 to the track centering network 49. This network 49 includes a preamplifier stage 50 and an equalizer 52 for processing the RF video signals retrieved by the head 12 in a conventional manner. Within the track centering network 49, the equalized signals are coupled to an RF detector 54 to which is also coupled timing signals on leads 56 and 81 to enable the detector 54 to determine the amplitude of the RF video signal within a given time period independent of the video picture content. Preferably, such timing signals enable the detector to operate only on the horizontal sync tip portion of the FM RF video signal. The specific construction of such an RF detector is of course well known to those skilled in the art and need not be further discussed herein. Nonetheless, the signal produced therefrom which is preferably linearly indicative of the amplitude of the horizontal sync tip region of the RF envelope, is coupled on lead 58 to an A to D converter and clock network 60 which converts the analog signal on lead 58 into a parallel digital signal corresponding thereto, which signal is outputted on leads 62 for further processing. To control the timing of the digitaized signal within the A to D converter, an additional timing signal on lead 64 is provided to the network 60. Further, the A to D converter 60 also provides an end of convert (EOC) signal on lead 66, which signal indicates data ready, and is used to signal the head position control network 104 that the RF amplitude has been sensed and digitized, and is ready to be read.

The RF detector 54, and A to D converter 60 which operates on the output therefrom, may preferably first include an RF switch which is strobed by a signal on lead 56 from the horizontal pulse generator 80 at the horizontal sync tip intervals, i.e. at 7.06 MHz. The amplitude of the signal at that time is then coupled to an amplitude demodulator; and the demodulated amplitude coupled through a carrier reject filter, having a cutoff above two MHz, to a DC restorer circuit and thence to a sample and hold circuit. The sample and hold circuit may in turn be strobed by the pulse from the horizontal pulse generator and the output therefrom passed through a low pass filter having a cutoff at about 1 kilohertz to a second sample-and-hold circuit prior to being digitized. Accordingly, the digital equivalents to the amplitudes of successive horizontal sync signal components may be compared within the microprocessor 106 to generate the requisite head position servo control signal.

In addition to utilizing the signals provided by the equalizer circuit 52 in the track centering network 49, the signals from the equalizer 52 are also coupled to a limiter circuit 68 and are thence demodulated within the demodulator circuit 70, coupled through a low pass filter 72 and thence into a conventional time base corrector 74, after which fully corrected video output signal are provided on lead 76. The limiter 68, the modulator 70 and the low pass filter 72 are all conventional circuits and need no further description herein. The time base corrector circuit 74 is preferably a commercial unit such as provided by Nippon Electric Corporation (NEC) as Model NTC-10. The non-time base corrected video signal from the low pass filter 72 is further coupled to a sync separator circuit 78, and outputs therefrom are in turn coupled to the horizontal pulse generator 80 and the vertical sync separator 82. The output signal from the equalizer 52 is further coupled to a dropout detector 84 and signals indicative of a detected dropout are thus provided to the time base corrector 74, sync separator 78, and vertical sync separator 82, to thereby deactivate the unit in the event of a detected dropout so as to prevent an erroneous sync pulse signal from being generated.

The horizontal pulse generator 80 is again of conventional construction and includes circuits for providing timing signals on leads 56 and 64 to the RF detector 54 and A to D converter 60 as described hereinabove. These signals thus control the timing of the A to D converter and enable the production of the signal from the RF detector only during the horizontal sync pulse interval. Analogously, the vertical sync separator 82, again of conventional construction, provides a vertical sync pulse on lead 86 synchronous with the signal provided by the playback head 12, which synchronizing signal is further used to control the head positioning signals in a manner to be described hereinafter. Vertical sync is also provided on lead 81 to the RF detector 54, which contains a sample timing processor (not shown) to ensure that the RF level is measured at the same point or points along each helical track.

In order to control the transverse position of the head 12 relative to the helical tracks on the tape media to accommodate varying tape speeds, means are provided for sensing such speeds. As shown in FIG. 3, as the tape leaves point X on the drum assembly 10, it is coupled along a transport path between a friction treated capstan 88 and pressure roller 90 prior to the tape 92 being rewound on a takeup reel. The capstan is in turn driven by a capstan drive motor 94, and associated therewith is a tachometer 46, which provides an accurate representation of tape motion via an instantaneous tape motion signal on lead 98. In a conventional manner the tachometer 96 provides a pair of signals, the relative phase therebetween being indicative of the direction of tape motion. These signals are coupled to a tape direction signal processing circuit 100, which then provides a direction dependent signal on lead 102.

As further shown in FIG. 3, the head position control network 104 receives inputs 62 and 66 from the A to D converter 60, the tape speed and direction indicating signals on leads 98 and 102, and a vertical sync pulse signal on lead 87, which is formed from the tape vertical sync signal on lead 86 "OR" gate protected for dropout immunity by the reference vertical sync signal on lead 89. The network 104 is preferably formed using a microprocessor and associated circuitry, a first portion thereof 106 being dedicated for processing head position servo control signals, i.e., the head centering component ($Y_2$), a second portion 107 being dedicated for processing the reset signal component ($Y_1$), and a third portion 108 being dedicated for processing signals to generate the overall waveform, the period and amplitude of which is controlled by the various input signals as supplemented by the outputs from the portions 106 and 107, and provides an output to form the head position control signal which appropriately drives the head positioning assembly. In such an embodiment, the network 104 further includes a crystal controlled clock 110 for maintaining appropriate timing signals for the respective microprocessing portions 106, 107 and 108 and support circuitry. The head positioning control signal provided by the control network 104 is thereafter coupled on parallel leads 112 in digital form to a first digital to analog converter 114, which converts the digital form of the signal into an analog signal corresponding thereto on lead 116. This signal is coupled to the deflection amplifier 118 and the output therefrom coupled on leads 126 and 128, respectively, to the slip ring assembly 42 for coupling to the drive coil 20 (See FIG. 2). A second set of digital signals in parallel output form are provided on leads 120 to D to A converter 122 to provide an analog signal on lead 124 to enable display on a waveform monitor.

Also coupled by means of the slip ring assembly 42 are DC power and ground connections on leads 130 and 132 for the position sensor. The output from the sensor amplifier 32 is coupled on lead 134 to the impedence network 136. The position sensing signal, together with the impedence network, thereby provide a second input signal which is sensitive to extraneous variations in the position of the head 12, and when added to the head position control signal on lead 116 acts to electrically damp the drive signal. As thus coupled to the drive coil 20, oscillations in the beam deflections are counteracted, and precise control over the movement and position of the beam 16 and head 12 mounted thereon is obtained. The combined signals on lead 116 are thereafter coupled together with a DC offset signal into an amplifier 138, the output of which is coupled on lead 126 to the slip ring assembly and thence to the drive coil 20.

Having now described the basic components making up the head positioning assembly of the present invention, the manner by which the head position control network may be structured may now be set forth. The output counter within the microprocessor network 108 and the crystal controlled clock 110 coupled thereto, is firstly structured to respond to a pulse train from the clock 110 containing a predetermined number N of clock pulses for each video field, synchronized by the vertical sync pulses on lead 87. Since each video field has a duration $T_\nu$, the period of the clock pulses thus produced is equal to $T_\nu \times (1/N)$.

Analogously, the tachometer 96 is constructed to provide an instantaneous tape motion signal indicative of the instantaneous tape speed and direction of motion. That signal typically contains a number M of fractional speed indicating tach pulses occurring during the time $T_\nu$, which pulses are coupled to the network 104 via lead 98. The spacing between each of the tach pulses corresponds to the time required for a predetermined length i.e., 1/N of tape to traverse the capstan. Accordingly, when the tape is traversing at normal video record and playback speeds, N speed indicating pulses are produced during the traverse past the capstan of a length of tape having recorded thereon one video field. The distance between tracks is referred to as D, and there are thus N of the M speed indicating pulses to represent the distance D. The tachometer can be coupled to the capstan shaft such that the pulses produced thereby are in direct proportion to the revolution of the capstan and thence to the instantaneous speed of the tape past the capstan.

Having now coupled to the output counter within the microprocessor 108, the pulse train containing the predetermined number N of clock pulses for each video field, together with the number M of speed indicating pulses occurring during the time $T_v$, which thus corresponds to the actual instantaneous tape speed, the number M of pulses and number N of clock pulses provided during the time $T_v$ are used to alter the level in the output counter to generate the $Y_0$ component of the head position control signal, the magnitude of which varies between 0 and d, where d is equal to $$\frac{D(M - N)}{N},$$

where D is the distance on the tape between adjacent helical tracks corresponding to successive video fields.

For example, at normal tape speeds where M is equal to N, d will be equal to 0, such that no deflection of the head 20 is provided, other than by the head position servo network 106 to correct for tape slippage and the like. Upon each revolution of the drum assembly 10 the head is automatically repositioned to follow the next successive track. Similarly, at stop motion, M will be equal to 0, since no pulses from the tachometer 96 are being produced. Therefore d will equal D, and a uniformly increasing head position control signal will be provided to the drive coil during each video interval to cause the head to be uniformly scanned across a single helical track. Similarly, for any variation of speeds, other than stop motion or full speed motion, including both fractional forward speeds, high forward speeds, and reverse motion, the difference between N and M pulses will be indicative of the requisite $Y_0$ signal component to be applied to the drive coil 20 to cause the head to move transversely in a proportional amount to accommodate the relative track displacement.

Upon completion of a given scan, the reset signal generating network within the microprocessor section 107 responds to the vertical sync pulses on lead 87 to determine the reset amplitude $Y_1$ required to position the beam 16 correctly prior to the start of the next rotation of the scanner drum. The network 107 determines the reset according to the rules stated hereinabove, thus providing both frame conversion and maintaining the deflection of the beam 16 within its available range of deflection.

In addition to the generation of the $Y_0$ component supplemented with the $Y_1$ reset jump component in an open loop system, which is thus independent of the precise position of the head on a given track, a closed loop feedback system is desirably added so as to maintain the head centered within a given track. In such a system, means are provided for supplementing the head position control signal with a head centering signal component $Y_2$ to cause the movement of the head a nominal distance in one transverse direction. Such means include means for determining a first amplitude of a picture level independent portion of the RF video playback signal following such movement. The A to D converter 60 then stores the digital representation of that first amplitude, and the servo portion 106 further supplements the head position control signal to cause movement of the head a second nominal distance in a known direction. The detector 54 then determines a second amplitude of a picture level independent portion of the RF video signal following the movement in the known direction; and the head position servo network 106 compares the first and second amplitudes to generate a head centering signal, to thus cause the successive movements of the head following each comparison a nominal distance in whichever transverse direction is appropriate to cause the second amplitude to exceed the first received amplitude.

The output counter 108 of the microprocessor within the control network 104 is desirably structured to determine the instantaneous amplitude of the head positioning control signal. One section within the microprocessor presets a step counter at the onset of each video field to a preselected number of counts or clock pulses provided by a precision timer, which clock pulses are successively decremented down to zero at the end of each head scan. The N clock pulses forming the reference signal are also stored in the output counter. The microprocessor is further structured to respond to counts produced upon each occurrence of a M instantaneous tape motion signal for subtracting that number of counts from the number of counts remaining in the output counter, such that the remaining number at any given time during a given field is proportional to the distance the head needs to be moved transverse to the direction of the tracks to enable the head to follow that track, regardless of differences between the instantaneous tape speed and the speed at which the recording was originally produced. That number is then coupled on leads 112 to the digital-to-analog converter 114 to generate an analog signal on lead 116, the magnitude of which is proportional to the remaining number of counts such that a corresponding current may be generated in the deflection amplifier 118 to drive the drive coil 20 with the requisite waveform signal.

While the generation of the head position control signal has been described hereinabove as preferably being provided by means of the head position control network 104, including a head position servo section 106, a reset section 107, and an output counter section 108, implemented via a microprocessor, it is also within the scope of the present invention that the head positioning control signal may be generated by discrete digital signal processing components. Thus, for example, as shown in FIG. 4, a playback head 12 identically structured on a deflectable member within a rotating head assembly as shown in FIGS. 1-2, may provide an RF video playback signal which is processed in a track centering network 142 and in a head position control network 140.

The track centering network 142 includes a preamplifier and equalization circuit 144 in like manner to that shown in FIG. 3. The output of such an equalization circuit is coupled to a video RF amplitude demodulator 146 and to an A to D converter 148. The demodulated RF signal level is coupled to a sample-and-hold pulse processor 150 to which is also coupled a horizontal sync signal derived from the VTR FM video demodulator 146. An analog horizontal sync tip value obtained from the RF amplitude sensing demodulator 146 is also coupled on lead 154 to a second sample-and-hold circuit 156. Accordingly, in like manner to that described above in conjunction with FIG. 3, an 8-bit parallel digital signal may then be provided at the output of the converter 148, which is indicative of the amplitude of the RF signal during the horizontal sync tip interval. Such a signal is coupled on lead 158 to the head position servo network 162 in a manner totally analogous to the coupling of such a signal on lead 62 to the network 106 shown in FIG. 3. Also provided as an output from the A to D converter 148 is an EOC signal on lead 160 which is coupled to the network 162.

Figure 4:
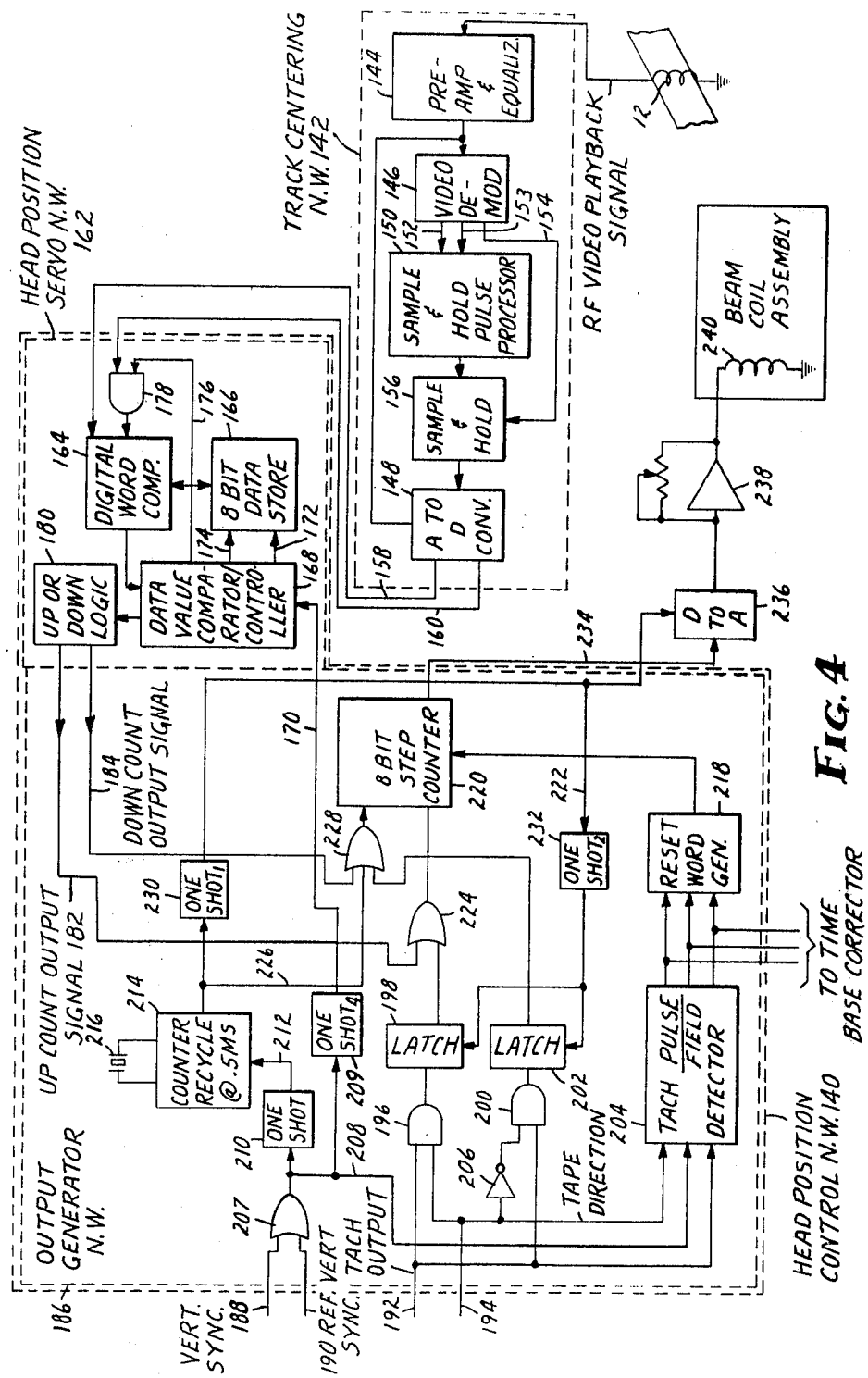
FIG. 4 is a block diagram of an alternative construction of the present invention.

As shown in FIG. 4, the head position control network 140 includes a head position servo network 162 and an output generator network 186. Within the head position servo network 162, each successive received data value of the RF level is received within a digital word comparator 164 and is coupled to an 8-bit data storage register 166. As successive data values are received, the stored value and newly received value are coupled to a comparator/controller circuit 168. That circuit responds to a field rate strobe on lead 170, and either stores new data and provides a store signal on lead 172, or transfers the signal on lead 174 to the storage register 166, and provides a new word load strobe signal on lead 176 to "AND" gate 178 to thereby control the transfer and storage of newly received RF level data values. Depending upon whether newly received data values are greater or less than the preceding values, signals are then coupled from the comparator/controller 168 to the up-down logic latch 180. Accordingly, if the new data values are greater than the preceding values, the controller 168 instructs the logic latch 180 to count up, and to provide an up-count output signal on lead 182 for so long as the new data continues to exceed the magnitude of the preceding received data. In contrast, if the new data values are less than the preceeding data values, the controller 168 instructs the logic latch 180 to provide a down-count output signal on lead 184 and to continue producing down-count signals until again the result changes. The up or down-count signals on leads 182 or 184 respectively, are then coupled to the network 186.

The network 186 responds to tape vertical sync pulses and reference vertical sync pulses on leads 188 and 190, respectively, and to tach pulses and to forward/reverse tape direction indicating pulses on leads 192 and 194, respectively, in a manner totally analogous to the receipt of such signals on leads 86, 89, 98 and 102, respectively, as shown in the embodiment in FIG. 3. In the embodiment of FIG. 4, the tach pulses received on lead 192 are coupled through an AND gate 196 to a first latch 198. The input tach pulse signals on lead 192 are further coupled to a second AND gate 200 and thence through a second latch 202, and are also coupled to a tach pulse/field detector 204. Similarly, the forward or reverse direction indicating signals on lead 194 are also coupled to the first AND gate 196, through an inverter 206 to the second AND gate 200 and to the tach pulse/field detector 204.

The additional inputs indicative of the tape vertical sync pulses and the reference vertical sync pulses on leads 188 and 190 are coupled through a summation circuit 207 to provide a vertical sync pulse signal on lead 208 which is further coupled to the tach pulse/field detector 204. This combined vertical sync pulse signal on lead 208 is further coupled through a "one-shot" 210 on lead 212 to provide a start and stop pulse to a recycle counter 214 and through a second "one-shot" 209 to provide the field rate strobe signal on lead 170. The counter 214 thus responds to the fundamental frequency provided by the crystal 216 to run at 0.5 millisecond intervals, to restart counting upon the initiation of each vertical sync pulse, and thereby provides 32 pulses per video field. The coupling of the respective signals on leads 192, 194, and 208 to the tach pulse/field detector 204 thus enables the combination of the three input signals and generates three appropriate output signals representing plus 1, a minus 1, and a minus 2 reset signals to coincide with the jump commands required for frame conversion. The track jump would cause mistiming in the time base corrector if not correctly identified therein. The three signal outputs from the detector 204 are further coupled to a reset word generator 218, the output of which is an 8-bit parallel loaded strobe pulse which is coupled to an 8-bit step counter 220, so as to preload the counter with a predetermined number of counts, such as, preferably, 32 counts upon each resetting. Accordingly, the tach pulses on lead 192 are coupled through the AND gates 196 or 200, and thence through the latches 198 or 202 in response to a latch output strobe on lead 222, the generation of which will be described hereinafter, and thence through OR gate 224 to the 8-bit step counter 220. Similarly, the resultant vertical sync pulse, which is also coupled to the counter 214, produces counter pulses on lead 226, which are coupled through a second OR gate 228 and thence to the 8-bit step counter 220.

Accordingly, the count held in the step counter 220 is incremented up or down progressively, depending upon whether the tach pulses on lead 192 are greater or less than the pulses produced by the recycle counter 214. The recycle counter 214 further provides the counter pulses on lead 226 through a "one-shot" 230 which is coupled on lead 222 and thence through the one-shot 232 to strobe the latches 198 and 202. The count held within the 8-bit step counter 220 is thus adjusted during each video field, depending upon the difference between the instantaneous tape speed pulses and the duration between the reference video sync pulses. The output of the step counter 220 is in turn coupled on leads 234 to the D to A converter 236, thence in analog form through amplifier 238 to provide the head position control signal to the beam drive coil 240. Similarly, the up-down signals on leads 182 and 184, which correspond to the head position servo signals provided by the servo network 106 in FIG. 3, are coupled to the OR gates 224 and 228, and are there combined with the tach pulse on lead 192 and the recycle counter 214 to further adjust the count held within the 8-bit step counter commensurate with the need to reposition the head for track centering purposes.

The manner in which the microprocessor sections 106, 107 and 108 within the preferred embodiment shown in FIG. 3 are preferably structured to carry out the various processing of the signals is shown in a simplified flow diagram shown in FIG. 5. The control chosen for the sequence of processing steps to be performed by the microprocessor is based on the "interrupt" capability of the particular microprocessor used (Intel 8085). However, other control methods could be used with equal facility. The interrupt sequence enables processing on demand, where the microprocessor performs each of the listed functions in FIG. 5 according to a predetermined priority, which is represented by the relative order in the flow diagram. Upon the occurrence of a vertical sync signal on lead 87, the vertical interrupt 244 is initiated and the microprocessor then processes the vertical interrupt subroutine 246. See FIG. 6. A counter interrupt 248 is enabled to be initiated by the 0.5 millisecond precision timer within the clock 110, at which time the counter interrupt sub-routine is processed. See FIG. 7. Similarly, tachometer interrupt 252 is initiated by the tach pulses, one interrupt per tach pulse and upon each such occurrence the tachometer routine 254 is executed. See FIG. 8. The head servo routine 256 is initialized and performed according to the timing of the "one-shot" delay set to provide the RF sample sequences at a selected point or points on the helical track, thereby completing the program such that a subsequent sequence may then be initiated. See FIG. 9.

Of critical importance to the entire execution of the routines set forth hereinabove, is the output counter, which responds to the precision 0.5 millisecond timer or clock. The count level in the output counter at any given time determines the level of the resultant head position control signal and hence to the absolute transverse position of the head. The count level thereby provided is also related to the tape speed, such that 32 counts are incrementally subtracted from the count level over 32 steps per head scan period to cause the head to transversely move a distance D at zero or stop motion, while substantially no alteration of the count level is provided at normal operating speed. Analogously, 32 counts are also incrementally subtracted over 32 steps per scan period, with a 64 jump added to the count once every four fields to cause the head to move a distance 2D in ¼ reverse speed. At two times forward, there will be 32 counts incrementally provided in the opposite direction over 32 steps per scan, i.e., added to the count level. A change in the count level is generated upon each increment of the precision clock unless a capstan tach pulse is received, which cancels the generation of that count change. The count level thus determines the new position of the playback head at the onset of the next scan. The head position control signal then continues to recenter the head until the frame conversion (track jump) is indicated by the range limit rules described above.

The vertical routine shown in FIG. 6 is, as mentioned above, initiated once per video field by the vertical sync pulses which occur at 0.0167 second increments. Upon receipt of a vertical sync pulse, then, the vertical routine performs the following functions:

First, a step counter adapted to maintain a count used to generate the $Y_1$ signal component is reset to 31;

Second, the precision 0.5 millisecond timer is stopped and restarted. This enables the output wave-form generator to sync to the incoming vertical syn pulse, and Third, the vertical interrupt routine is reset.

The start and stop of the precision timer causes the step wave form generated to be in sync with the vertical interrupt. The vertical routine also determines whether the tape speed is greater than normal for four consecutive fields and indicates this status by a fast flag output as provided via sequences 264 or 266 to decrement or increment by the fast flag routines 268 or 270.

Figures 7, 8:
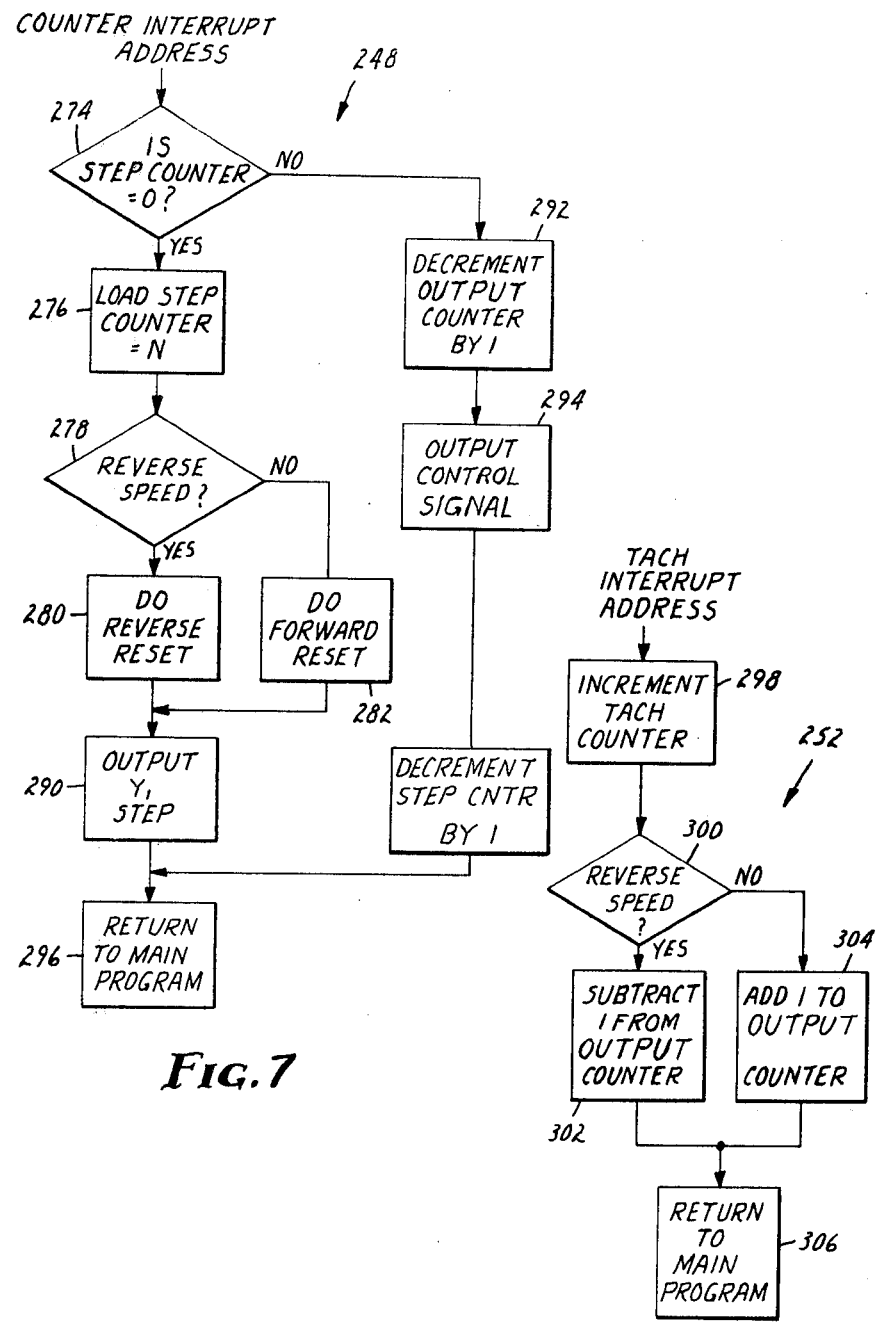

The counter interrupt routine shown in FIG. 7 is as follows:

At each cycle of the precision clock 110, the content of a step counter controlling the $Y_1$ component is addressed. If that counter has counted down to zero, which occurs at the end of each field, it is loaded with 32 counts, as shown in block 276. Upon so loading, the tape direction monitor is addressed as shown in block 278, and if reverse tape motion is indicated, a reverse reset is executed as shown in block 280, which adds 32 counts to the level in the output counter upon the occurrence of the next vertical sync pulse. The count level is then again checked and a second jump of 32 counts is added to the level if the level is still less than 39. If normal forward speed is indicated, a forward reset is indicated as shown in block 282, at which point, upon the occurrence of the next vertical sync pulse, 32 counts are subtracted from the level in the output counter, to result in an output step is provided as shown in block 290. As shown at the top of FIG. 7, if on the other hand, at the initiation of the counter interrupt routine the step counter controlling the $Y_1$ component is not equal to zero, the count within the output counter is decremented by one count as shown in block 292. After such a decrementation the changed level is outputted as shown in block 294. Upon the outputting of the new level, the step counter is also decremented, thus completing the subroutine, and the microprocessor returns to the main program.

The tachometer interrupt is shown in FIG. 8. The tachometer interrupt is initiated by the tach pulses, one interrupt per tach pulse. The routine thus adds one count to the output counter upon each tachometer pulse if the tape is moving in the forward direction. If the tape is moving in the reverse direction, one count is subtracted from the output counter for each tach pulse. Accordingly, as shown in FIG. 8, upon instruction from the interrupt address, a separate "tach" counter responsive to the tach pulses is incremented, as shown in block 298. Upon such incrementation, the tape direction monitor is addressed as shown in block 300, and if the tape direction is in reverse, one count is subtracted from the output counter as shown in block 302. If the tape is not moving in the reverse direction, one count is added to the output counter as shown in block 304. The process then returns to the main program according to block 306.

Figure 9:
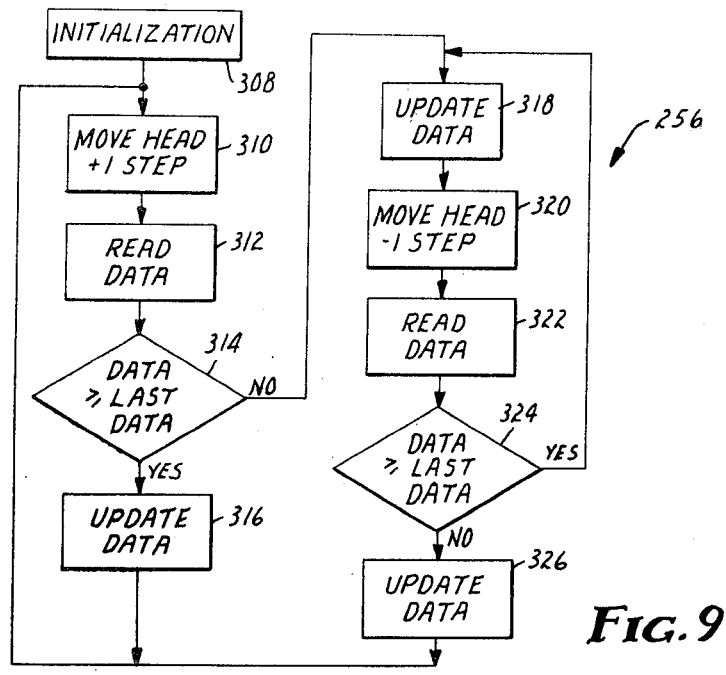

These three interrupts, i.e. the vertical interrupt, counter interrupt and tachometer interrupt, working independently of each other, thus create the waveform for conversion into the head position control signal. This waveform varies continuously from ¼×reverse speed to 2×forward speed. When the head is driven with such a waveform, the head will thus trace a path that is parallel to the recorded track through a whole range of speed thereinbetween. However, without the head servo routine, the head might still not be riding on the center of the recorded track. Hence, a head servo routine, shown in FIG. 9, is necessary. As set forth above, by searching for the peak of the video RF level during horizontal sync tip (digitized value), the head control signal may be supplemented to control the positioning of the head toward the center of the track. This routine is initiated by helical track sample point selection timing as shown in block 308. Upon initiation, one count is added to the output counter to cause the head to move in an arbitrary direction one step, as shown in block 310. Thereupon, the value of the horizontal sync tip is then read as shown in block 312 and compared with a previously read data as shown in block 314. If the newly received data is greater than the last data, instructions are provided by block 316 for returning to the earlier block 312 to again move the head one step in the first direction.

Contrariwise, as shown in block 314, if the data is not greater than the previously received data, the data is again updated as shown in block 318 and the one count is subtracted from the output counter so as to move the head in the opposite direction one increment, as shown in block 320. Upon so doing, the data is again read as shown in block 322, and compared with the previously received data, as shown in block 324. If, at this point, the data is greater than the last received data, the routine again goes back to update the data as shown in block 318, and again moves the head one step in the opposite direction as shown in block 320. If, on the other hand, the data is not greater than the previously received data, the stored data value is again updated as shown in block 326, and the routine returns to block 310 to cause the head to move in the opposite direction one increment.

It should be emphasized that the data is read and the head moved incrementally to accomplish the head servo routine at a selected point or points along the helical scan track. This routine occurs only at the field rate, i.e. approximately every 1/60 of a second.

Figure 10:
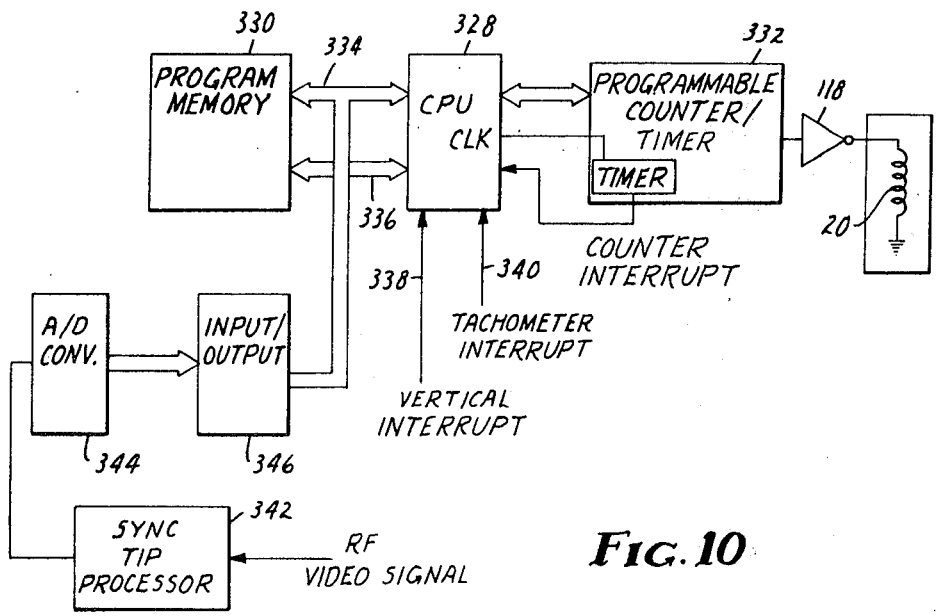
FIG. 10 is a block diagram of a preferred embodiment of an automatic track following subsystem embodied in the present invention.

FIG. 10 sets forth a block diagram of the aided track following system of the present invention, as particularly set forth using an Intel type 8085 central processing unit 328, in conjunction with a programmable read-only-memory 330, such as Type 2718, and a programmable counter 332, such as an Intel Type 8156. As shown in FIG. 10, the central processing unit 328 is coupled to the read-only-memory 330 by means of data buses 334 and address buses 336, and responds to vertical interrupt and tachometer interrupt signals on leads 338 and 340.

The microprocessor 328 is controlled by vertical interrupt signals on lead 338 and tachometer interrupt signals on 340, to thereby control the central processor unit 328 in conjunction with programmed instructions in the read-only memory 330 and counter 332, to thereby generate $Y_0$ and $Y_1$ components of the head position control signal, which is coupled to the deflection amplifier 118 to drive the coil 20 as shown in FIG. 3. Similarly, to provide the head centering component $Y_2$ of the head position control signal, the RF video signal as provided in the RF detector 54 is coupled to the sync tip processor 342 and the output therefrom coupled to an A/D converter 344, and in parallel form to the input/output addressable latch 346 such as a Type 8255. The relative level of the video RF signal in the region of the horizontal sync tip is thereby compared within the processor 328 as set forth hereinabove and an appropriate supplemental signal component is added to the magnitude of the other components of the position control signal. As particularly structured for use with the Type 8085 CPU 328, port A of such a unit may be dedicated to provide the output to the D to A converter which is used to provide the signal to the deflection amplifier and thence to the drive coil. Analogously, port B of such a CPU unit may be utilized as the input from which the digitized horizontal sync values may be provided from the A to D converter 344 via I/O latch 346. Finally Port C of such a CPU unit may be utilized to provide the output which is utilized to reset flip-flop latches between the respective priority interrupts and the CPU.

The various details by which such or similar central processing units may be structured to generate wave forms such as described hereinabove are all within the state of one skilled in the art and hence need no further description other than that provided in the flow charts set forth above. It is within the scope of the present invention that variants based on the above utilizing other types of microprocessors, read only memories, and the like, may similarly be implemented to provide similar signal processing functions.

The above-described improvements have been combined in a new video-helical scan reproduced. However, the improvements may be used independently of one another and in various applications other than helical scan reproducers. Moreover, many alternatives, modifications, and variations in the specific embodiments described herein will be apparent to those skilled in the art. Accordingly, the present invention is intended to include all such alternatives, modifications, and variations which fall within the spirit and scope of the invention as defined by the appended claims and equivalents thereof. Various features of the invention are set forth in the following claims.

Having thus described the present invention, what we claim is:

1. In a rotary scan video tape player of the type having a playback head operatively mounted within a rotatable drum for scanning a magnetic tape along a plurality of adjacent discrete tracks oriented at an angle relative to the length of the tape, said head being mounted within the drum on a head positioning transducer for moving the head within a given range relative to a nominal position along a path generally transverse to the direction of said tracks in response to a head position control signal, the improvement comprising:

a network for forming said head position control signal which may vary in amplitude and polarity to modify the transverse position of the head according to the need to adjust the angle of the scanning path, the available range of the head positioning transducer, and frame conversion requirements, wherein the instantaneous amplitude Y of the head position control signal varies according to the expression $$Y = Y_0 + Y_1 + Y_2$$

where $Y_0$ represents an instantaneous amplitude component related to the difference between the tape speed employed during recording and the instantaneous playback tape speed, $Y_1$ represents an instantaneous amplitude component related to the need to reset the head positioning transducer to maintain it within its available range and to enable frame conversion, and $Y_2$ represents an instantaneous amplitude component for centering the head over the recorded tracks, said network including (a) means for generating each of the $Y_0$, $Y_1$, and $Y_2$ instantaneous amplitude components as discrete signal pulses, (b) digital counter means coupled to said generating means for combining said discrete pulses and for providing a digital count representative of said combined pulses, said count being the digital representation of the instantaneous amplitude of said head positioning control signal, and (c) means for converting said digital representation into an analog signal, the magnitude of which is proportional to said count and for providing said head position control signal in which the instantaneous amplitude thereof is proportional to said analog signal, wherein said means for generating said $Y_0$ component comprises (i) means for providing a reference signal containing a predetermined number N of clock pulses per video field extending over a time interval $T_v$, where N is a reasonably large number, to allow numerous head position adjustments per video field, (ii) means for providing an instantaneous tape motion signal having tach pulses indicative of the tape speed and direction of motion, the spacing between successive tach pulses corresponding to the time required for 1/N of the length of tape containing one video field to traverse a given location, where the number of tach pulses M occurring during the time interval $T_v$ is equal to the number of N clock pulses during the same time interval when the playback speed is equal to the record speed, and (iii) means for supplying said reference signal to said digital counter means for incrementing the number of counts therein by one count in a first direction upon each occurrence of a reference signal pulse, and for supplying said instantaneous tape motion signal to said digital counter means for incrementing the number of counts therein by one count in the opposite direction upon each occurrence of a tach pulse if such pulses are indicative of forward tape motion and for incrementing the number of counts therein by one count in the first direction upon each occurrence of a tach pulse if such pulses are indicative of reverse tape motion such that at any time during each field scan the number remaining in the counter means is proportional to the distance required to move the head transverse to the direction of said tracks to compensate for differences between the instantaneous playback and record speed and direction of tape motion.

2. A player according to claim 1, wherein said means for generating said $Y_1$ component comprises means responsive to the count in said counter at the end of each head scan and to said instantaneous tape motion signal for algebraically adding to the count in said counter a predetermined number of counts to cause the head to move transversely a distance which is a positive or negative integral multiple of the distance on the tape between adjacent tracks corresponding to successive fields thus enabling the head to repeatedly scan the same track or to skip over an adjacent track.

3. A player according to claim 1, wherein said digital counter means includes an output counter and a precision timer adapted to output periodic pulses to the output counter to alter the count level therein.

4. A player according to claim 3, wherein said network comprises:
  (a) means for executing a head servo routine responsive to an RF video playback signal for comparing digital levels of sampled components of said playback signal and for altering the count in said output counter to cause the head position control signal to increase or decrease in the appropriate direction to minimize each subsequent sample,
  (b) means for executing a vertical interrupt routine for resynchronizing the precision timer upon each occurrence of a vertical sync pulse,
  (c) means for executing a counter interrupt routine for generating a reverse or forward reset depending on the count level in the output counter and direction of tape movement and for algebraically incrementing said count level upon each count of said precision timer, and
  (d) means for executing a tachometer interrupt routine responsive to said tach pulses for algebraically incrementing said count level in a direction depending upon the direction of tape movement, wherein said interrupt routines are executed according to priorities, the vertical interrupt routine having the highest priority and the tachometer interrupt routine the lowest priority.

5. A player according to claim 4, wherein said means for executing said counter interrupt provides said $Y_1$ component, and comprises step counter means responsive to each count of said precision timer for determining the count level in said step counter means, means responsive to said vertical sync pulses for loading said step counter with a predetermined number of counts and means responsive to the tape direction component of said tape motion signal for outputting said counts to said output counter to algebraically change the level therein by an amount equal to an integral multiple of that required to transversely move the head a distance D, where D is the distance between adjacent tracks.

6. A player according to claim 4, wherein said means for executing said counter interrupt routine further comprises means responsive to each count of said precision timer providing said reference signal pulses to increment said output timer to contribute to the formation of said $Y_0$ component.

7. A player according to claim 6, wherein said means for executing said tachometer interrupt routine further comprises a tachometer counter, means responsive to each of said tach pulses, and hence to the tape speed and direction of tape motion for incrementing the count in said tachometer counter upon each tach pulse depending upon the direction of tape motion, and for outputting the count in said tachometer counter to said output counter as said instantaneous tape motion signal, whereby the count level in said output counter resulting from said reference signal pulses and said instantaneous tape motion signal pulses results in said $Y_0$ component.

8. A player according to claim 1, wherein said means for generating the head centering component $Y_2$ comprises:
  (a) RF detector means responsive to said RF video playback signal for providing a playback level sense signal indicative of the amplitude of said playback signal independent of the picture levels therein,
  (b) storage means for storing a digital representation of said level sense signal,
  (c) comparison means for comparing said stored digital representation with a subsequently received digital representation of said level sense signal and for providing an error signal indicative of the relative amplitudes thereof, and
  (d) control means for supplementing said head position control signal for controlling said transverse head movement so as to minimize said error signal.

9. A player according to claim 8, wherein said means for generating the head centering component further comprises:
  (a) timing means for gating on said detector means during the horizontal sync tip such that the amplitude of said level sense signal is indicative of the amplitude of the horizontal sync tip component of said playback signal, (b) means for providing a head centering component $Y_2$ to cause the movement of said head a nominal distance in one transverse direction,
(c) means for determining a first amplitude of said level sense signal following said movement,
(d) means for storing a digital representation of said first amplitude,
(e) means for providing another head centering component $Y_2$ to cause the movement of said head a second nominal distance in said one transverse direction,
(f) means for determining a second amplitude of said level sense signal following said movement a second nominal direction, and
(g) means for comparing said first and second amplitudes to generate a said head centering component $Y_2$ to cause successive movements of said head following each comparison a nominal distance in the transverse direction appropriate to cause said second amplitude to exceed said first amplitude.

10. A player according to claim 9, wherein said RF detector means further comprises:
(i) switch means responsive to the time interval defined by the horizontal sync tip component of said RF video playback signal for providing a time window during which is taken a sample of the RF envelope of said playback signal,
(ii) demodulation means responsive to said sample for providing a pulse, the amplitude of which relative to a base line is representative of the absolute amplitude of the RF envelope sample,
(iii) first sample and hold means responsive to said sync tip component for passing a portion of each of said pulses substantially centered about a central point thereof free of noise and edge transition disturbances, and
(iv) second sample and hold means responsive to said sync tip component for providing a playback level sense signal having a continuous DC signal corresponding to said pulse amplitude.

* * * * *